United States Patent
Eidson

(10) Patent No.: US 6,173,207 B1
(45) Date of Patent: *Jan. 9, 2001

(54) REAL-TIME CONTROL SYSTEM WITH NON-DETERMINISTIC COMMUNICATION

(75) Inventor: John C. Eidson, Palo Alto, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/934,792

(22) Filed: Sep. 22, 1997

(51) Int. Cl.[7] ................................................. G05B 11/01
(52) U.S. Cl. ............................ 700/14; 700/306; 702/187
(58) Field of Search ................................... 318/600, 636; 702/117, 187; 340/825.2, 825.21; 375/355, 356, 224; 370/473, 516; 700/1, 10, 2, 14, 44, 45, 73, 74, 306

(56) References Cited

U.S. PATENT DOCUMENTS

| | | | |
|---|---|---|---|
| 4,975,865 | * 12/1990 | Carrette et al. | 364/139 |
| 5,293,374 | * 3/1994 | Eidson | 702/117 |
| 5,586,305 | 12/1996 | Eidson et al. | 395/500 |
| 5,774,377 | * 6/1998 | Eidson et al. | 702/187 |
| 5,887,029 | * 3/1999 | Husted et al. | 375/224 |

FOREIGN PATENT DOCUMENTS

| | | |
|---|---|---|
| 0362971 A2 | 4/1990 | (EP) . |
| 0415637 A2 | 3/1991 | (EP) . |
| 0550809 A1 | 7/1993 | (EP) . |
| 0622713 A2 | 11/1994 | (EP) . |
| WO 92/16905 | 10/1992 | (WO) . |
| WO 96/01979 | * 1/1996 | (WO) . |

* cited by examiner

Primary Examiner—Paul P. Gordon
Assistant Examiner—Steven R. Garland

(57) ABSTRACT

A control system that provides accurate timing information for sensor data samples and accurate timing for the application of control values to actuators in the face of non-deterministic communication. The control system employs circuitry for accurately associating sensor data samples and sensor time-stamps and circuitry for triggering the application of the control values to an actuator.

17 Claims, 4 Drawing Sheets

REAL-TIME CONTROL SYSTEM WITH NON-DETERMINISTIC COMMUNICATION

BACKGROUND OF THE INVENTION

1. Field of Invention

The present invention pertains to the field of control systems. More particularly, this invention relates to real-time control systems that employ non-deterministic communication.

2. Art Background

Real-time control systems commonly include sensors and actuators and application controllers which are arranged to provide control of devices including devices used in industrial processes. Such sensors may include temperature sensors, pressure sensors, tachometers, etc. Such actuators may include, valves, motors, heaters etc. Application controllers in such a control system may be implemented with programmable logic controllers (PLCs) or computer systems including personal computer systems.

A real-time control system in its simplest form includes an application controller, at least one sensor, and at least one actuator. Typically, the application controller implements a control algorithm which is adapted to maintain a set point for a particular device being controlled. Typically, the application controller obtains sensor data samples from the sensor and uses the sensor data samples as inputs to a control algorithm which computes a control value to be applied to the actuator. The application controller then usually writes the control value to the actuator. Typically, the application controller continually obtains sensor data samples and continually provides control values to the actuator in order to maintain a desired set point. Such an arrangement may be referred to as a closed-loop control system.

For example, a simple real-time control system for a motor may include a tachometer (sensor) that measures the rotational speed of the motor and an amplifier circuit (actuator) that increases or decreases the rotational speed of the motor in response to a control value applied to the amplifier circuit. An application controller periodically obtains rotational speed samples from the tachometer and periodically writes control values to the amplifier circuit in order to maintain the desired set point for the speed of the motor.

A typical control algorithm for such a real-time control system typically uses timing information together with sensor data samples to compute control values. In addition, such a control algorithm usually associates timing information with each control value. One such type of control algorithm is referred to as a proportional integral derivative (PID) algorithm. A PID algorithm usually takes as input a time value associated with each sensor data sample. The time values enable the PID algorithm to take into account the rate of change of the sensor data samples when computing a new control value. In addition, the PID algorithm usually assigns a time value to each new control value which indicates a time at which the new control value is to be applied to the actuator.

As a consequence, a real-time control system must usually provide accurate timing information for each sensor data sample in order to render accurate computation of control values. In addition, a real-time control system must typically apply each control value to the actuator with accurate timing in order to provide accurate control of the desired set point. Unfortunately, prior control systems commonly suffer from inaccuracies in the relationship between the sensor data samples and their associated timing information. In addition, inaccuracies commonly exist as to the time that a control value is applied to an actuator in prior systems. In general, such uncertainties are caused by the non-deterministic nature of communication that is commonly employed in prior real-time control systems.

For example, the sensors, actuators, and controllers in prior real-time control systems are commonly interconnected via a communication network. Such a communication network may be implemented with a packet-based communication protocol that includes collision handling. Ethernet is an example of a packet-based network with collision handling. Another example is LonTalk which is a field-level control bus specialized for the process control environment. Such a communication network may also be implemented with time division multiple access (TDMA) or token ring protocols to name a few.

An application controller connected to such a communication network typically obtains sensor data samples using messages transferred over the communication network. Typically, the application controller includes a real-time clock which is used to assign a time value to each sensor data sample received over the communication network.

Typically, a delay exists between the time a sensor data sample is generated and the time an application controller obtains a time value for that sensor data sample from its real-time clock. Such delay usually includes the delay associated with message transfer over the communication path. Such delay also typically includes the delay associated with the application controller obtaining a time value from its real-time clock.

In addition, a delay usually exists between the time the time that an application controller generates a control value and the time that the control value is applied to an actuator. Such delay usually includes the delay associated with message transfer over the communication path to the actuator as well as the delay in the actuator before the control value is applied.

Such delays, both in sensor data timing and in the application of control values, are usually not constant. Instead, such delays typically vary in a non-deterministic or random manner. Such variation in delay may be referred to as jitter. Jitter may be caused by the variation of traffic on the communication network. In addition, collisions that occur on the communication network can introduce substantial amounts of jitter. Other sources of jitter may include variation in the time taken by an operating system, under which the application controller usually runs, to render a real-time clock value in the face of varying amounts of operating system activity.

Unfortunately, such jitter usually creates inaccuracies in associating time values to sensor data samples. Such jitter also typically creates inaccuracies in the timing of the application of the control values to actuators. Such inaccuracies typically decreases the accuracy and efficiency of such prior control systems.

SUMMARY OF THE INVENTION

A control system is disclosed that provides accurate timing information for sensor data samples and accurate timing for the application of control values to actuators in the face of non-deterministic communication. The control system includes a sensor node with circuitry that generates a sensor time-stamp substantially contemporaneously with a time at which it obtains a sensor data sample. The sensor time-stamp enables accurate computation of an actuator control value and an actuator time-stamp. The control system includes an actuator node having circuitry for triggering the application of the actuator control value to an actuator using the actuator time-stamp.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
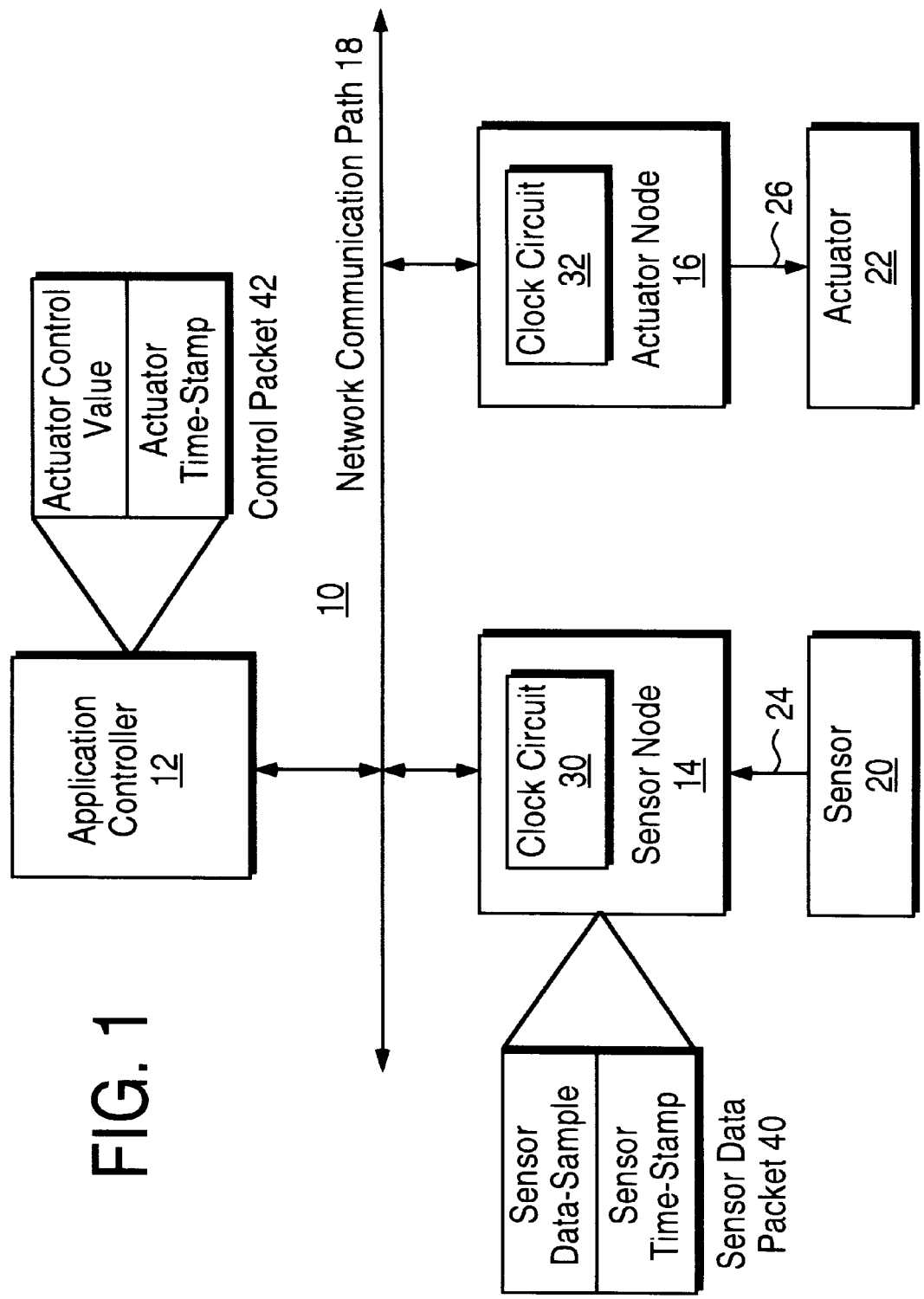
FIG. 1 illustrates one embodiment of a real-time control system that provides accurate timing information for sensor data samples and accurate timing for the application of control values to actuators in the face of non-deterministic communication.

FIG. 1 illustrates one embodiment of a real-time control system 10 that provides accurate timing information for sensor data samples and accurate timing for the application of control values to actuators in the face of non-deterministic communication. The real-time control system 10 includes an application controller 12, a sensor node 14 and an actuator node 16. The sensor node 14 includes circuitry that enables accurate time-stamping of sensor data samples of a sensor 20. The actuator node 16 includes circuitry that enables the accurate application of control values to an actuator 22.

The network communication path 18 may be implemented with one of a variety of communication mechanisms. In one embodiment, the network communication path 18 is an Ethernet communication network. In another embodiment, the network communication path 18 is a LonTalk field-level control bus which is specialized for the process control environment. In other embodiments, the network communication path 18 may be implemented with time division multiple access (TDMA) or token ring protocols to name only a few possibilities.

The sensor 20 represents any sensor that may be employed in a real-time control system. Such sensors include for example devices such as temperature sensors, pressure sensors, and tachometers. The actuator 20 represents any actuator that may be employed in a real-time control system. Such actuators include for example devices such valves, motors, heaters, and amplifiers.

The sensor node 14 interfaces the sensor 20 to the network communication path 18. The sensor node 14 includes the communication hardware and software necessary for communication via the network communication path 18. The sensor node 14 also includes a clock circuit 30 that enables accurate time-stamping of sensor data samples obtained from a sensor 20.

The actuator node 16 interfaces the actuator 22 to the network communication path 18. The actuator node includes the communication hardware and software necessary for communication via the network communication path 18. The actuator node 16 also includes a clock circuit 32 that enables the accurate application of control values to an actuator 22. In one embodiment, the clock circuits 30 and 32 are synchronized by transferring time packets via the network communication path 18 and providing the sensor node 14 and the actuator node 16 with time packet detectors in a manner described in U.S. Pat. No. 5,566,180.

The application controller 12 implements a process control algorithm for closed loop control of a device (not shown). The application controller 12 senses the performance of the device using the sensor 20 and controls the performance of the device using the actuator 22. For example, the device may be a motor and the actuator 22 may be an amplifier that controls the speed of the motor and the sensor 20 a tachometer that measures the speed of the motor. The application controller 12 includes the communication hardware and software, i.e. protocol stack, necessary for communication via the network communication path 18. The application controller 12 may be implemented as programmable logic controller (PLC) or as a computer system.

The sensor node 14 generates a sensor data sample by sampling a sensor data signal 24 from the sensor 20. At the same time the sensor node 14 obtains a sensor time-stamp from the clock circuit 30. The sensor time-stamp is obtained form the clock circuit 30 substantially contemporaneously with the sampling of the sensor data signal 24 in order to provide an accurate sensor time-stamp. In one embodiment, the sensor node 14 samples the sensor data signal 24 in response to a request message for sensor data that is received via the network communication path 18. Such an embodiment may be referred to as a pull system in that an external node pulls data from the sensor node 14. The request for sensor data may originate with the application controller 12 or with the actuator node 16.

The sensor node 14 generates a sensor data packet 40. The sensor data packet 14 includes the sensor data sample obtained from the sensor 20 and the sensor time-stamp obtained from the clock circuit 30. The sensor node 14 transfers the sensor data packet 40 via the network communication path 18. The sensor data packet 40 in a pull system is transferred to the node on the network communication path 18 that issued the request for sensor data which may be either the application controller 12 or the actuator node 16.

In another embodiment, the sensor node 14 samples the sensor data signal 24 and obtains a corresponding sensor time-stamp without any request messages. This embodiment may be referred to as a push system. In a push system, the sensor node 14 is preprogrammed to periodically obtain sensor data samples and sensor-time stamps. The sensor node 14 periodically transfers the sensor data packet 40 containing newly obtained sensor data samples and sensor time-stamps over the network communication path 18 to either the application controller 12 or the actuator node 16.

In the following discussion it is assumed that the application controller 12 implements the process control algorithm. The application controller 12 receives the sensor data packet 40 via the communication path 18 and uses the sensor data sample and sensor time-stamp contained therein as inputs to its process control algorithm. The process control algorithm generates an actuator control value and a corresponding actuator time-stamp which indicates a future time at which the actuator control value is to be applied to the actuator 22. The application controller 12 assembles actuator control value and actuator time-stamp into a control packet 42. The application controller 12 then transfers the control packet 42 to the actuator node 16 via the network communication path 18.

The actuator node 16 receives the control packet 42 via the network communication path 18 and uses the actuator time-stamp contained therein as a triggering event for applying the actuator control value to the actuator 22 as an actuator signal 26. The actuator node 16 synchronizes the application of the actuator control value to the actuator time-stamp using the clock circuit 32. The clock circuit 32 is synchronized to the clock circuit 30 and the application controller 12 derives the actuator time-stamp from the sensor time-stamp which was generated by the clock circuit 30.

The process control system 10 shown depicts an embodiment in which the application controller 12 obtains sensor data samples and time-stamps from the sensor node 14 via the network communication path 18, computes actuator control values and actuator time-stamps, and then transfers the actuator control values and time-stamps to the actuator node 16 via the communication path 18. In another embodiment, the process control algorithm may be implemented in the actuator node 16 which includes a processor and other software execution resources. In such an embodiment, the actuator node 16 obtains sensor data samples and time-stamps from the sensor node 14 via the communication path 18, computes actuator control values and time-stamps, and applies the actuator control values to the actuator 22.

In yet another embodiment, the process control algorithm for the device attached to the actuator 22 is implemented in the sensor node 14 which includes a processor and other software execution resources. In such an embodiment, the sensor node 14 obtains sensor data samples and time-stamps, computes actuator control values and time-stamps, and then transfers the actuator control values and time-stamps to the actuator node 16 via the network communication path 18.

Figure 2:
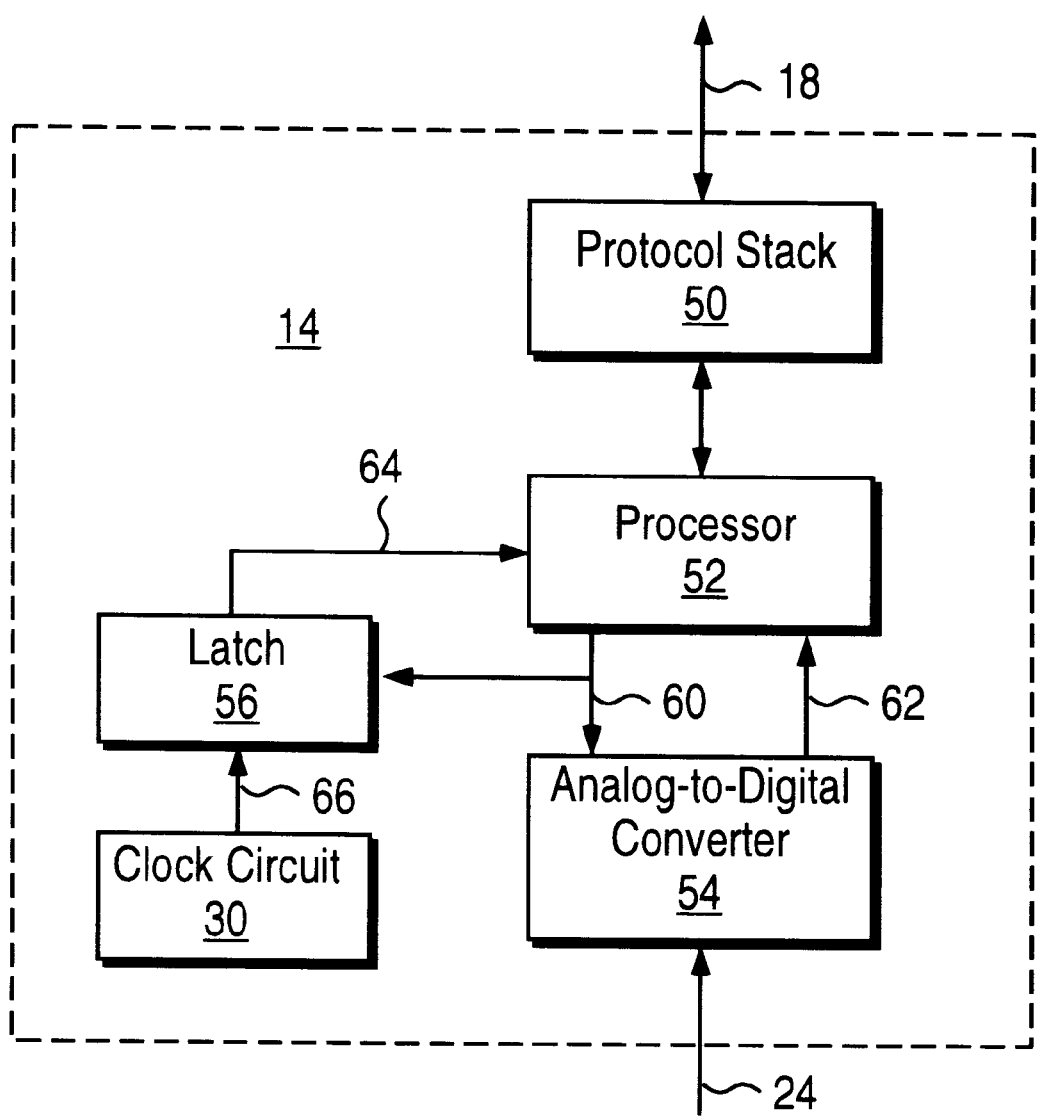
FIG. 2 illustrates one embodiment of mechanisms in a sensor node for accurately time-stamping sensor data samples.

FIG. 2 illustrates mechanisms in the sensor node 14 for accurately time-stamping sensor data samples in one embodiment. The sensor node 14 includes a processor 52 that obtains a sensor data sample 62 from an analog-to-digital converter 54 and a sensor time-stamp 64 from the clock circuit 30 and then assembles the sensor data packet 40. The sensor node 14 also includes a protocol stack 50 which includes the software and hardware elements that enable communication via the network communication path 18.

The analog-to-digital converter 54 is coupled to receive the analog sensor data signal 24 from the sensor 20. The analog-to-digital converter 54 generates the sensor data sample 62 by digitizing the sensor data signal 24 in response to a strobe signal 60 generated by the processor 52. The analog-to-digital converter 54 holds the sensor data sample 62 for subsequent reading by the processor 52. The strobe signal 60 also causes a latch 56 to sample and hold a clock value 66 from the clock circuit 30. The strobe signal 60 causes the latch 56 to sample the clock value 66 substantially contemporaneously with the sampling of the sensor data signal 24 by the analog-to-digital converter 54.

In one embodiment, the processor 52 issues the strobe signal 60 to sample the clock value 66 and the sensor data signal 24 in response to a request message received via the network communication path 18. In another embodiment, the processor 52 periodically issues the strobe signal 60 to sample the clock value 66 and the sensor data signal 24. For example, the processor 52 may read or "poll" the clock value 66 to determine when another set of samples of the clock value 66 and the sensor data signal 24 should be obtained.

The processor 52 reads the sensor data sample 62 held by the analog-to-digital converter 54 and writes it into the sensor data packet 40. In addition, the processor 52 reads the sensor time-stamp 64 held by the latch 56 and writes it into the sensor data packet 40. The processor 52 then transfers the sensor data packet 40 over the network communication path 18 using the protocol stack 50. The sensor data packet 40 in pull system is transferred to the requesting node, for example the application controller 12. In a push system, the processor 52 transfers the sensor data packet 40 to either the application controller 12 or the actuator node 16 whichever is predetermined to be the target.

Figure 3:
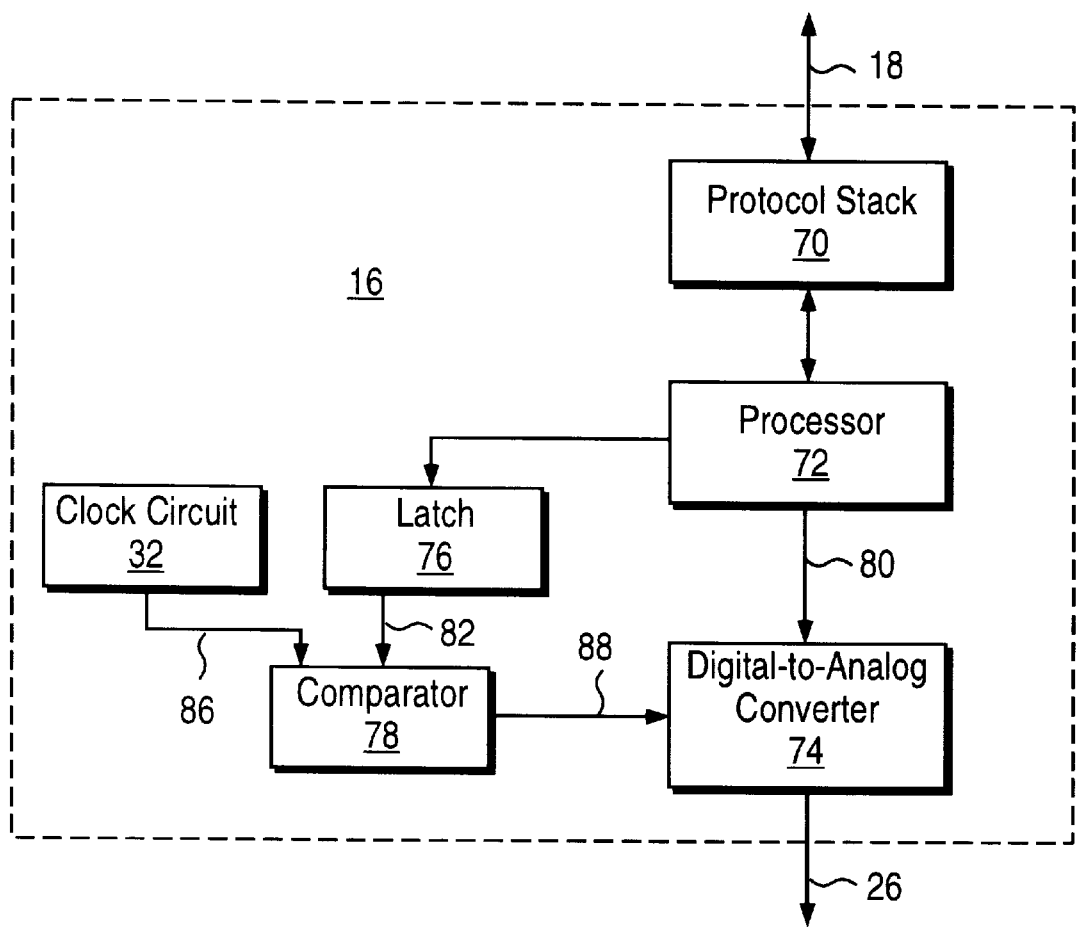
FIG. 3 illustrates one embodiment of a mechanism in an actuator node for accurately applying actuator control values to the actuator.

FIG. 3 illustrates one embodiment of a mechanism in the actuator node 16 for accurately applying actuator control values to the actuator 22. The actuator node 16 includes a protocol stack 70 which includes the software and hardware elements that enable communication via the network communication path 18. The actuator node 16 also includes a processor 72 that receives the control packet 42 via the network communication path 18 using the protocol stack 70.

The processor 72 writes the actuator control value from the control packet 42 to a digital-to-analog converter 74 as a control value 80. The digital-to-analog converter 74 holds the control value 80 until a strobe signal 88 is asserted by a comparator 78. In addition, the processor 72 writes the actuator time-stamp contained in the control packet 42 into a latch 76.

The comparator 78 compares a latched actuator time-stamp 82 with a free running clock value 86 generated by the clock circuit 32. The comparator 78 asserts the strobe signal 88 when the free running clock value 86 reaches the latched actuator time-stamp 82. The strobe signal 88 causes the digital-to-analog converter 74 to convert the control value 80 into an actuator control signal 26 for the actuator 22.

In another embodiment, the triggering function provided by the comparator 78 is instead performed in firmware, for example, with a compare instruction executed by the processor 72.

Figure 4:
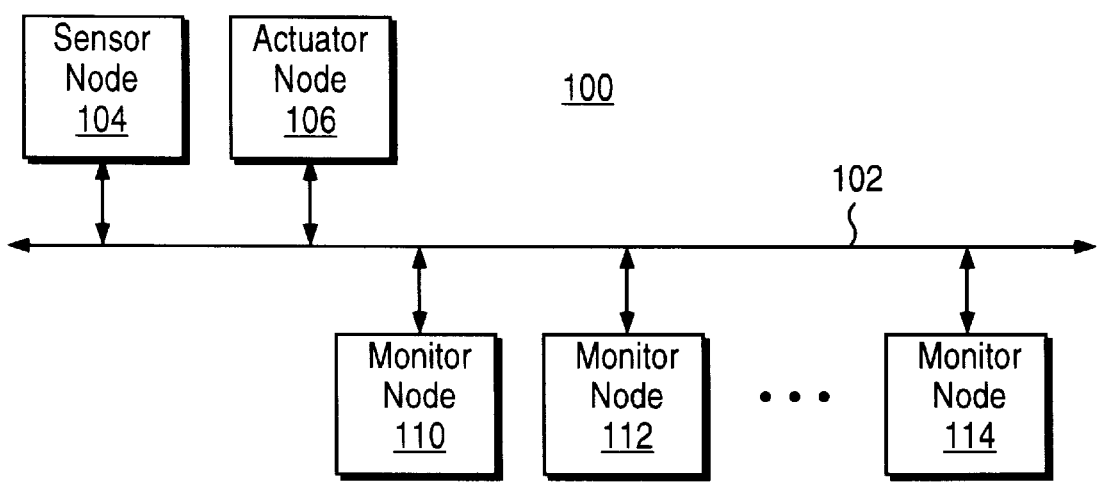
FIG. 4 shows a process control network which implements methods for handling event storms.

FIG. 4 shows a process control network 100 which implements methods for handling event storms. The process control network 100 includes a sensor node 104 and an actuator node 106 that together implement a control loop. The sensor node 104 and the actuator node 106 each include a synchronized clock circuit and the hardware and software elements for communication via a network communication path 102. The sensor node 104 periodically transfers a sensor data packet containing a sensor data sample and a corresponding sensor time-stamp to the actuator node 106 via the network communication path 102.

In one embodiment, the sensor node 104 and the actuator node 106 provide a pull system in which the actuator node 106 periodically transfers a request messages to the sensor node 104 via the network communication path 102. The sensor node 104 responds to each request message by obtaining a sensor data sample and a corresponding sensor time-stamp and transferring them in a sensor data packet via the network communication path 102. In another embodiment, the sensor node 104 and the actuator node 106 provide a push system in which the sensor node 104 periodically obtains a sensor data sample and a corresponding sensor time-stamp and transfers them in a sensor data packet via the network communication path 102.

The process control network 100 includes a set of monitor nodes 110–114. Each of the monitor nodes 110–114 performs a monitoring function to detect an unusual event or alarm in the process control network 100. These alarms may be, for example, over-temperature alarms or other events that must be communicated to other parts of the process control network 100.

A condition may occur in the process control network 100 which may be referred to as an event storm. An event storm may occur, for example, when a large number of the monitor nodes 110–114 detect an unusual event. The monitor nodes 110–114 that detect an unusual event transfer alarm messages via the network communication path 102 to notify other parts of the process control network 100 of the unusual events.

The large number of alarm messages transferred via the network communication path 102 during an event storm can consume most of the available bandwidth of the network communication path 102. These event storms can cause large numbers of collisions and the resulting collision arbitration mechanism on the network communication path 102 can slow overall throughput in the process control network 100. As a consequence, the messages required to maintain the control loop between the sensor node 104 and the actuator node 106 can become delayed or even lost or transferred out of order.

The sensor time-stamps contained in the sensor data packets transferred over the network communication path 102 enable the detection of delayed or missing or out of order sensor data packets. For example, assume the control loop between the sensor node 104 and the actuator node 106 includes the sampling of sensor data every t0 seconds. If so, then a sensor data packet should be transferred via the network communication path 102 approximately every t0 seconds and the sensor time-stamp contained in each sensor data packet should differ from a previous one by approximately t0 seconds. If two consecutive sensor data packets carried on the network communication path 102 have timestamp values that differ by significantly more than t0 seconds then it is an indication that sensor data packets are being delayed or lost possibly due to an event storm.

Any one or more of the actuator node 106 and the monitor nodes 110–114 may use the sensor time-stamps in the sensor data packets transferred via the network communication path 102 to detect event storms. The actuator node 106 as the target already receives the sensor data packets and extracts the sensor time-stamps to compute actuator control values. In addition, the monitor nodes 110–114 can monitor or "snoop" the network communication path 102 for sensor data packets and record the sensor time-stamps to detect delayed or missing sensor data packets.

In one embodiment, if for example the monitor node 110 detects delayed or missing sensor data packets that may signal an event storm it stops transferring monitor messages on the communication path 102 for a predetermined time period. In another embodiment, the monitor node 110 transfers an emergency notification message via the communication path 102 if it detects a possible event storm. The emergency notification message causes the remaining monitor nodes 112–114 to stop transferring messages on the communication path 102 for a predetermined time period.

Another method for detecting possible event storms involves the detection of collisions on the network communication path 102 for embodiments where the network communication path 102 provides collision handling such as Ethernet. For example, the protocol stack, i.e. the communication hardware and software, in the sensor node 104 includes a mechanism for logging the occurrence of collisions on the network communication path 102. The processor in the sensor node 104 periodically queries the corresponding protocol stack to determine whether excessive numbers of collisions are occurring which could indicate an event storm.

In another embodiment, the protocol stack in the sensor node 104 includes a outbound message queue for buffering messages for transfer via the network communication path 102. The processor in the sensor node 104 periodically checks the outbound message queue. A nearly full outbound message queue could indicate that an event storm is underway.

In one embodiment, the sensor node 104 and the actuator node 106 run their control loop in a reduced performance mode if an event storm is detected. In one embodiment of a reduced state, the sensor node 104 provides sensor data samples every t0/K seconds where K is a constant rather than the t0 samples per second in a normal state without an event storm. The reduced state reduces the bandwidth utilization on the network communication path 102 required to maintain the control loop.

In another embodiment, the sensor node 104 and the actuator node 106 put the control loop into a "safe" state if an event storm is detected. The safe state may correspond to the last control value successfully received by the actuator node 106. Alternatively, the actuator node 106 may turn off the actuator once an event storm is detected.

The monitor nodes 110–114 may take a variety of actions once an event storm is detected. For example, the monitor nodes 110–114 can stop transferring messages on the network communication path 102, including alarm messages, for a period of time. The monitor nodes 110–114 may continue to obtain monitoring data and may include synchronized clock circuits that enable the monitor data to be accurately time-stamped. This would enable the monitor nodes 110–114 to transfer the buffered monitor data and time-stamps via the network communication path 102 once the event storms end and allow a receiving node to reconstruct the monitor data with accurate timing information. Alternatively, the monitor nodes 110–114 can reduce that rate at which they transfer messages on the network communication path 102 for a period of time during an event storm.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A control system comprising:
   sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;
   means for detecting an event storm in the control system in response to the substantially contemporaneous time-stamps such that the sensor node runs a control loop at a reduced rate if the event storm is detected.

2. The control system of claim 1, wherein the sensor node includes means for determining the actuator control values and the actuator time-stamps in response to the data samples and the substantially contemporaneous time-stamps and means for transferring the actuator control values and the actuator time-stamps via the communication path.

3. The control system of claim 2, further comprising an actuator node for interfacing an actuator to the communication path, the actuator node having means for obtaining the actuator control values and the actuator time-stamps via the communication path and means for triggering the application of the actuator control values to the actuator using the actuator time-stamps.

4. The control system of claim 1, wherein the sensor node includes means for transferring the data samples and the substantially contemporaneous time-stamps via the communication path.

5. The control system of claim 4, further comprising an application controller node having means for receiving the data samples and the substantially contemporaneous time-stamps via the communication path and means for generating the actuator control values and the actuator time-stamps in response to the data samples and the substantially contemporaneous time-stamps and means for transferring the actuator control values and the actuator time-stamps via the communication path.

6. The control system of claim 5, further comprising an actuator node for interfacing an actuator to the communication path, the actuator node having means for obtaining the actuator control values and the actuator time-stamps via the communication path and means for triggering the application of the actuator control values to the actuator using the actuator time-stamps.

7. The control system of claim 4, further comprising an actuator node for interfacing an actuator to the communication path, the actuator node having means for obtaining the data samples and the substantially contemporaneous time-stamps via the communication path and means for generating the actuator control values and the actuator time-stamps in response to the data samples and the substantially contemporaneous time-stamps and means for triggering the application of the actuator control values to the actuator using the actuator time-stamps.

8. The control system of claim 1, wherein the sensor node further comprises means for transferring the data samples and the substantially contemporaneous time-stamps via the communication path in a series of sensor data packets.

9. The control system of claim 8, wherein the means for detecting an event storm comprises means for transferring an emergency notification message via the communication path if one or more of the sensor data packets is missing or delayed.

10. A control system comprising:
sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;
means for detecting an event storm in the control system in response to the substantially contemporaneous time-stamps wherein the means for obtaining the data samples and the substantially contemporaneous time-stamps comprises:
  circuit for generating a strobe signal;
  circuit for obtaining the data samples from the sensor in response to the strobe signal;
  circuit for obtaining substantially contemporaneous time-stamps from the clock circuit in response to the strobe signal.

11. A control system comprising:
sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;
means for detecting an event storm in the control system in response to the substantially contemporaneous time-stamps wherein the sensor node further comprises means for transferring the data samples and the substantially contemporaneous time-stamps via the communication path in a series of sensor data packets and wherein the means for detecting an event storm comprises a monitor node that snoops the communication path and examines the time-stamps to determine whether one or more of the sensor data packets is missing or delayed.

12. A control system comprising:
sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;
means for detecting an event storm in the control system in response to the substantially contemporaneous time-stamps wherein the sensor node further comprises means for transferring the data samples and the substantially contemporaneous time-stamps via the communication path in a series of sensor data packets and wherein the means for detecting an event storm comprises an actuator node for interfacing an actuator to the communication path that snoops the communication path and examines the time-stamps to determine whether one or more of the sensor data packets is missing or delayed.

13. A control system comprising:
sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;
means for detecting an event storm in the control system in response to the substantially contemporaneous time-stamps wherein the sensor node further comprises means for transferring the data samples and the substantially contemporaneous time-stamps via the communication path in a series of sensor data packets and wherein the means for detecting an event storm comprises means for transferring an emergency notification message via the communication path if one or more of the sensor data packets is missing or delayed and wherein the emergency notification message causes one or more other nodes on the communication path to stop transmitting messages on the communication path for a predetermined time interval.

14. A control system comprising:

sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;

means for detecting an event storm in the control system in response to the substantially contemporaneous time-stamps wherein the sensor node further comprises means for transferring the data samples and the substantially contemporaneous time-stamps via the communication path in a series of sensor data packets and wherein the means for detecting an event storm comprises means for transferring an emergency notification message via the communication path if one or more of the sensor data packets is missing or delayed and wherein the emergency notification message causes one or more other nodes on the communication path to transmit messages on the communication path at a reduced rate.

15. A control system comprising:

sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;

means for detecting an event storm in the control system in response to the substantially contemporaneous time-stamps wherein the sensor node further comprises means for transferring the data samples and the substantially contemporaneous time-stamps via the communication path in a series of sensor data packets and wherein the sensor node transfers the sensor data packets at a reduced rate if the event storm is detected.

16. A control system comprising:

sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;

means for detecting an event storm in the control system in response to the substantially contemporaneous time-stamps wherein the sensor node further comprises means for transferring the data samples and the substantially contemporaneous time-stamps via the communication path in a series of sensor data packets and further comprising an actuator node for interfacing an actuator to the communication path wherein actuator node switches off the actuator if the event storm is detected.

17. A control system comprising:

sensor node for interfacing a sensor to a communication path, the sensor node having a clock circuit and means for obtaining a series of data samples from the sensor and a series of substantially contemporaneous time-stamps from the clock circuit thereby enabling a relatively accurate computation of a series of actuator control values and a series of actuator time-stamps in response to the data samples and the substantially contemporaneous time-stamps;

means for detecting an event storm in the control system in response to the substantially contemporaneous time-stamps wherein the sensor node further comprises means for transferring the data samples and the substantially contemporaneous time-stamps via the communication path in a series of sensor data packets and further comprising an actuator node for interfacing an actuator to the communication path wherein actuator node applies a last successfully received actuator control value to the actuator if the event storm is detected.

* * * * *